United States Patent [19]

Rhoe

[11] 4,189,182

[45] Feb. 19, 1980

[54] STEP TAPERED BACK REST CUSHION

[76] Inventor: Stanley A. Rhoe, 414 W. Santa Cruz Dr., Tempe, Ariz. 85281

[21] Appl. No.: 910,232

[22] Filed: May 30, 1978

[51] Int. Cl.$^2$ ............................................... A47C 7/02
[52] U.S. Cl. ..................................... 297/460; 297/230
[58] Field of Search ...................... 247/230, 231, 460; 5/327 B, 338

[56] References Cited

U.S. PATENT DOCUMENTS

| 3,145,054 | 8/1964 | Sopko | 297/460 |
| 3,454,302 | 7/1969 | Radford | 297/230 |
| 4,047,757 | 9/1977 | Eames et al. | 297/460 X |

Primary Examiner—James C. Mitchell
Attorney, Agent, or Firm—Cahill, Sutton & Thomas

[57] ABSTRACT

A back rest cushion, useable with automobile seats and chairs, has a centralized vertical channel for non-contactingly receiving a user's spine. Resilient step tapered members extend upwardly to provide firm support at the upper buttocks and in the lumbar region while conforming to normal curvature of the backbone. The back of the cushion is semi-rigid and curved about a vertical axis to encourage lateral support for the rib cage while the channel precludes lateral pressure upon the spine.

10 Claims, 4 Drawing Figures

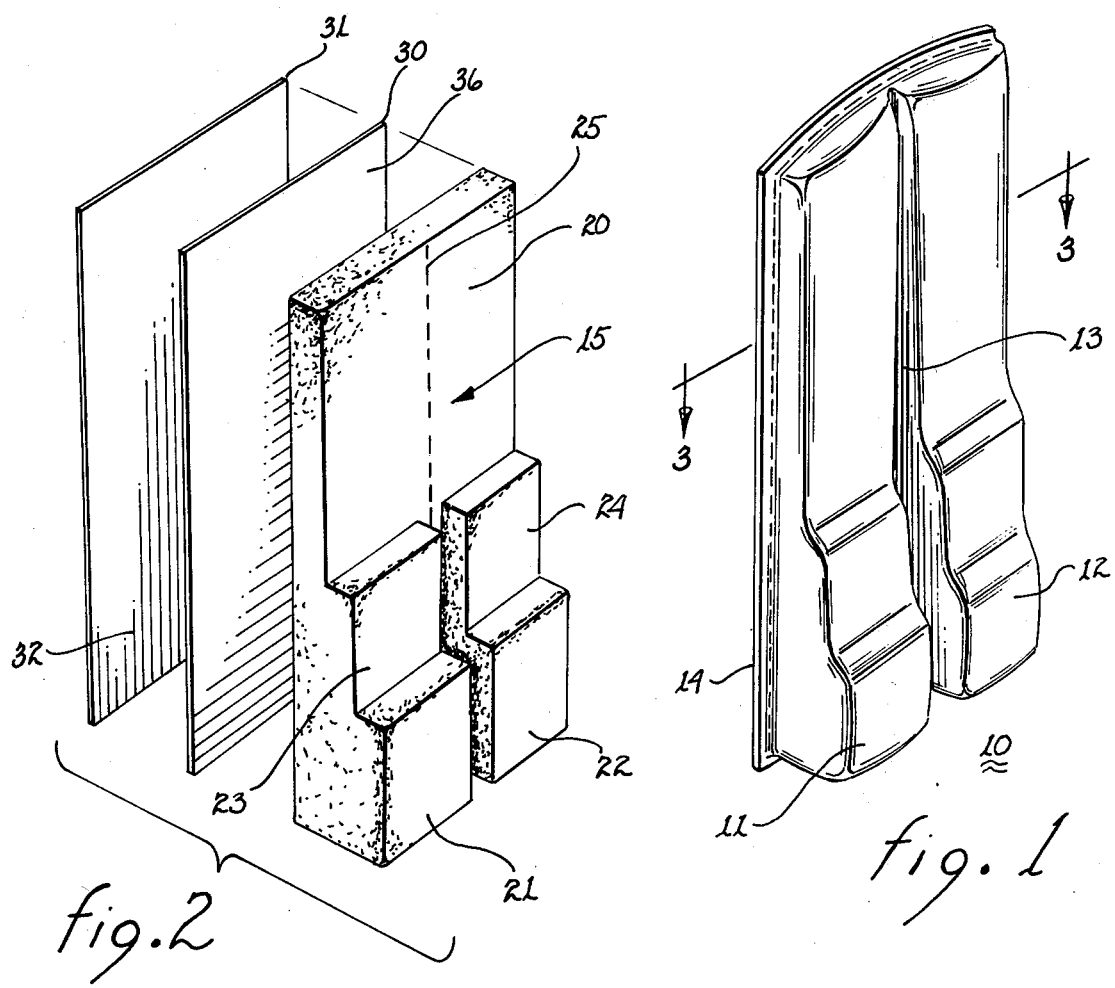

STEP TAPERED BACK REST CUSHION

The present invention relates to back rest cushions and, more particularly, to orthopedic back rest cushions.

Most commercially available chairs and automobile seats are designed and fabricated to meet the requirements of a "normal" sized person. Unfortunately, many persons do not meet these standards and they suffer, to varying degrees, substantial discomfort. Moreover, many persons who have suffered injuries to their hips or back need more support than available from conventional chairs and automobile seats or they need special support for certain parts of their body.

Because of a general physical lassitude, a large segment of the population has poor muscle tone. Such poor muscle tone results in rapidly developing fatigue of their back and hip muscles and contributes to physical discomfort when seated for any substantial length of time.

Recognition of these problems has resulted in many developments for various cushions and cushion-like devices useable in conjunction with conventional chairs and automobile seats. Wheeler et al. in U.S. Pat. No. 1,673,433 describes a seat back suspended from the top of a vehicular seat which provides lateral support for the mid-back region; no support for the buttock area is available. The U.S. Pat. to Mover, No. 2,146,085, describes a cushion, triangular in cross-section, which tapers upwardly in depth; the lateral edges of the cushion are somewhat greater in depth than the corresponding parts of the central section to provide lateral support. A truncated cylindrically shaped back support is illustrated in U.S. Pat. No. 3,197,255; this support is semi-rigid and provides substantial lateral support primarily for the buttocks.

To relieve discomfort arising from pressure bearing upon the sacral nerve, the cushion shown in U.S. Pat. No. 2,855,986, was developed; it incorporates a central void in the seat portion, which void continues partially into the back portion.

A pneumatic cushion is described in U.S. Pat. No. 3,145,054 which provides segregated air bags for supporting the thighs, the lower back region and the upper back region; the upper back region is developed from two lobes which bear against a user's shoulder blades.

A seat cushion having a recess coincident with the base of the spine and a detachably attached winged back rest is illustrated in U.S. Pat. No. 3,205,010. A lumbar support pad is described in U.S. Pat. No. 3,765,721 and serves the purpose of maintaining the spine in alignment.

Finally, U.S. Pat. No. 4,047,757 describes a one-piece seating structure having a seat portion and a back portion; removably attached cushion sleeves are mountable upon segregated portions of the split back rest. An anchoring projection secures the unit to the rear edge of the seat upon which the unit is mounted.

While the devices in the above identified patents infer or suggest certain aspects of the present invention, none of them teach the totality of the present invention, which totality renders the present invention orthopedically beneficial. In example, rearward pressure exerted by the back against a back rest tends to cause fatigue in the upper buttock/lower spine area unless support thereagainst is provided. Lack of support in the lumbar region, particularly when accompanied by poor muscle tone of the proximate muscles, produces fatigue in relatively short order. Pressure exerted upon the spine by a back rest tends to displace or at least apply pressure to the discs forming the spine, which pressure, coupled with previous injury or poor muscle tone, produces painful fatigue. Lateral suppport for the rib cage, particularly in a moving vehicle, is of significant importance in reducing fatigue of the back due to laterally imposed loads; additionally, the lateral support tends to preclude a tendency of the back to curve sideways due to fatigue and relaxation of the muscles.

It is therefore a primary object of the present invention to provide a back rest of orthopedic value.

Another object of the present invention is to provide a back rest which relieves pressure upon the spine while supporting the full length of the back.

Yet another object of the present invention is to provide a back rest which provides support for the upper buttock region.

Still another object of the present invention is to provide a back rest which provides support for the lumbar region.

A further object of the present invention is to provide a stepped upwardly tapered back rest.

A yet further object of the present invention is to provide a step tapered back rest which has a general concave curvature about a vertical axis.

A still further object of the present invention is to provide a curved back rest useable in conjunction with flat or contoured seat backs.

These and other objects of the present invention will become apparent to those skilled in the art as the description thereof proceeds.

The present invention may be described with greater specificity and clarity with reference to the following drawings in which:

FIG. 1 is a perspective view of the back rest;

FIG. 2 is an exploded view of the major components of the back rest prior to assembly;

FIG. 3 is a cross-sectional view taken along lines 3—3, as shown in FIG. 1; and

FIG. 4 is a cross-sectional view taken along lines 4—4, as shown in FIG. 3.

Referring to FIG. 1, there is shown a back rest 10 having a pair of laterally spaced upwardly stepped tapered cushion elements 11 and 12. These cushion elements define a vertical channel 13 disposed therebetween. The cushion elements are mounted upon a semi-rigid member 14, which member is curved about the longitudinal, or vertical, axis of back rest 10.

The respective components of the back rest will be described with reference to the exploded view illustrated in FIG. 2. Cushion elements 11 and 12 may be formed from a single unit 15 of resilient foam. The type and nature of the foam may be of any one of many commercially available synthetic materials, including sponge rubber. Alternatively, unit 15 may be constructed from a plurality of individual pieces of foam adhesively or otherwise attached to one another to form the configuration of the unit illustrated in FIG. 2.

The configuration of unit 15, in the preferred embodiment, may be described as follows. A base member 20, approximately fifteen inches wide, twenty-four inches long and one inch thick, supports a pair of cushions 21 and 22 having a width of seven inches, a length of five inches and a height of three and one-half inches and which cushions are spaced apart from one another by approximately two inches. In general longitudinal alignment with cushions 21 and 22, two further cushions 23 and 24 are developed. These cushions have a width of approximately seven inches, a length of six inches and a height of two inches. They are also spaced apart from one another by approximately two inches and are attached to member 20. As discussed above, manufacturing considerations may dictate that unit 15 is constructed from a single piece of foam material or the unit may be built up from a plurality of individual pieces of foam material.

Unit 15 is mounted upon a pair of adjacent supports 30 and 31. Support 30 is configured, in height and width dimensions, to be slightly greater than that of unit 20. The grain of support 30 (as indicated by lines 32) is laterally oriented with respect to the longitudinal axis of back rest 10. Support 31 is of the same dimensions as support 30 except that the grain thereof (as indicated by lines 33), is parallel to the longitudinal axis of back rest 10. Covering material 40 (see FIGS. 3 and 4), whether of natural or synthetic fibers, envelopes the components illustrated in FIG. 2. By employing a pair of supports 30 and 31 with the respective grains thereof orthogonal to one another, a certain degree of semi-rigidity is achieved which allows the use of paper composition materials rather than more expensive plywood or plastic sheet materials.

Referring jointly to FIGS. 3 and 4, certain constructional features of back rest 10 will be reviewed. During assembly, unit 15 may be adhesively attached to surface 36 of support 30; in the alternative, it may be simply located upon surface 36. Covering material 40 is laid over unit 15 and sewn along center line 25 (see FIG. 2) to secure the material to support 30 through the foam material of unit 15. Necessarily, the foam material of unit 15 will be compressed by the stitching along the center line and thereby partially form channel 13. It is to be understood that unit 15, instead of being a composite unit may be two identical units, each identical unit being step tapered. In such event, two individual units would be placed upon surface 36 of support 30 in general alignment along the longitudinal axis but somewhat spaced apart from one another along the center line.

Material 14 is pulled laterally in each direction from the center line and wrapped around edges 42 and 43 and sewn therealong to secure the lateral edges of the material. Depending upon the degree of lateral force applied to the covering material, the foam material defining the stepped taper will be compressed to a greater or lesser extent. Simultaneously, the resilient nature of the foam and because of compression thereof by covering material 40, support 30 will tend to curve concavely along the longitudinal axis, as illustrated in FIG. 3. The covering material is also drawn about upper edge 44 of support 30 and adhesively secured to the back surface thereof and about lower edge 45 of support 30 and adhesively attached to the back surface thereof. Necessarily, pleats and/or tucks must be incorporated to accommodate excess material at various locations.

To help maintain the form and configuration of bent support 30 and to resist bending of support 30 along an axis parallel to the grain of this support, support 31 is adhesively attached to the back surface of support 30. Prior to such attachment, however, covering material 41 is adhesively attached to the outer surface of the support and bent around the four edges thereof. Thereafter, the two supports are attached to one another adhesively and by stitches 45, 46 and 47 along edges 42, 43 and 44, respectively, of support 30.

The resulting configuration of back rest 10 will have, not the sharply defined steps as illustrated in FIG. 2, but the smoothed-out steps as shown in FIGS. 1 and 4. Such smoothing of the steps is, of course, accomplished by stretching the material across underlying unit 15 and the bending of support 30 against the grain which maintains the covering material in tension along its longitudinal and lateral axes. Moreover, the use of two supports adhesively attached to one another such that the axis of the respective grains are orthogonal to one another tends to preclude back rest 10 from conforming with the back rest contour of the seat back against which it is placed when in use. Thereby, back rest 10 provides a generally semi-rigid surface for supporting cushion elements 11 and 12 and which cushion elements are specifically configured to provide support for critical regions of a user's back.

In operation, back rest 10 provides a centralized channel 13 for non-contactingly receiving the user's spine and thereby precludes any pressure against the spine itself. On compression of the lower ends of cushion elements 11 and 12 by the user, the cushions will deform downwardly beyond edge 41 to some extent, which deformation will bear against and provide support for the upper portions of the user's buttocks. The resulting force exerted upon the upper portions of the user's buttocks provides a degree of support and comfort especially important for those with hip or spinal injuries or who have relatively poor muscle tone. Additionally, the stepped portions of cushion elements 11 and 12 will provide support for the lumbar region of the user. The overall concave curvature of back rest 10 about its longitudinal, or vertical axis, tends to cause the back rest to curve around the user's back and thereby provides support at the user's sides. Such lateral support is of importance from a comfort standpoint in vehicles.

From an orthopedic standpoint, back rest 10 has several advantages. It functions, regardless of the seat back against which it is placed, as a semi-rigid foundation for supporting cushion elements 11 and 12. These cushion elements provide support to prevent or discourage sideways slumping or curvature of the spine. And, they urge normal curvature of the spine in the fore and aft directions. Thereby, the normal loads placed upon the spine by a person in a seated position are supported to a great extent by back rest 10 and allow persons with hip and/or back injuries or one having poor muscle tone to remain orthopedically properly seated for long periods of time without exacerbating the injuries or promoting muscle fatigue. The employment of the centrally located channel avoids the pressure of any forces acting directly upon the spine itself and precludes the presence of lateral forces acting upon the discs of the spine.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A back rest for use with seat backs to provide support for a user's back, said back rest comprising in combination:

a. a support member having a longitudinal axis and a lateral axis;

b. a stepped unit secured to said support member for providing support against a user's back from the region of the user's upper buttocks to at least the region of the user's shoulder blades, said stepped unit being tapered upwardly along the longitudinal axis of said support member; and c. a channel disposed along the center line of said stepped unit parallel to the longitudinal axis of said support member for receiving the user's spine.

2. The back rest as set forth in claim 1 wherein said stepped unit comprises a stepped cushion element disposed on each side of said channel.

3. The back rest as set forth in claim 2 wherein said back rest has an upper end and a lower end and the maximum thickness of each of said stepped cushion elements is disposed at said lower end to provide support at the upper buttocks of a user.

4. The back rest as set forth in claim 3 wherein said support member is curved concavely about its longitudinal axis.

5. The back rest as set forth in claim 4 wherein said support member includes a first support having its grain parallel to the lateral axis of said support member and a second support having its grain parallel to the longitudinal axis of said support member.

6. The back rest as set forth in claim 5 wherein said stepped unit is developed from a resiliently compressible foam material.

7. The back rest as set forth in claim 6 including covering material for containing and partially compressing said foam material.

8. The back rest as set forth in claim 7 wherein the terminal end of said stepped unit at said lower end is configured to expand beyond the perimeter of the adjacent edge of said support member during use of said back rest.

9. The back rest as set forth in claim 8 wherein lateral protrusion of said stepped unit beyond the lateral edges of said support member and said upper end is restrained by the means for attaching said covering material to said support member.

10. The back rest as set forth in claim 9 wherein said attaching means comprises a sewn line.

* * * * *